United States Patent [19]
Abrams et al.

[11] 4,384,961
[45] May 24, 1983

[54] PROCESS FOR FILTRATION OF AQUEOUS OIL-CONTAINING BRINES

[75] Inventors: Howard Abrams, Plainview; Barrington T. Allen, Bayville, both of N.Y.

[73] Assignee: Pall Corporation, Glen Cove, N.Y.

[21] Appl. No.: 379,534

[22] Filed: May 18, 1982

[51] Int. Cl.$^3$ ............................................. B01D 29/38
[52] U.S. Cl. .................................... 210/756; 210/758; 210/765; 210/791; 210/799; 175/66; 166/267
[58] Field of Search ............... 210/753, 754, 756, 758, 210/759, 760, 761, 762, 763, 765, 767, 791–798, 799, 805; 175/66; 166/266, 267

[56] References Cited

U.S. PATENT DOCUMENTS

| | | | |
|---|---|---|---|
| 2,768,949 | 10/1956 | Hewey | 210/758 |
| 3,944,487 | 3/1976 | Davis | 210/756 |
| 4,184,953 | 1/1980 | Allinson | 210/791 |
| 4,352,739 | 10/1982 | Oliver | 210/791 |

FOREIGN PATENT DOCUMENTS

53-35899  4/1978  Japan ................................. 210/791

*Primary Examiner*—Ernest G. Therkorn

[57] ABSTRACT

A process is provided for filtration of aqueous oil-containing brines that are substantially free from viscosity-increasing agents, which comprises adding to the aqueous oil-containing brine having a tendency to contaminate and plug a filter a sufficient amount of an oxidizing agent capable of reacting with plugging contaminants present in the brine to alleviate the plugging tendency, thereby extending filter life.

5 Claims, No Drawings

PROCESS FOR FILTRATION OF AQUEOUS OIL-CONTAINING BRINES

It is now generally accepted that filtration of recirculating completion fluids helps ensure that well productivity will be maximized. Filtration by removal of suspended material precludes plugged perforations in wells, and eliminates reduced permeability zones in perforation tunnels or other regions. In gravel pack operations, clean completion fluids also assist in completing a well that will actually produce consistent with its potential. Many wells produce a rate substantially below their potential, because of dirty completion fluids.

Filtration also helps in the recovery of heavy completion fluids prior to reuse in additional completion operations. Recovery of expensive completion fluids such as aqueous calcium bromide and aqueous zinc bromide is required for both economic and enviromental reasons. Filtration can return these fluids to as new or better clarity.

For both well completion and gravel pack operations, clean fluids devoid of microscopic particles can be obtained through point-of-use filtration. Such filtration ensures maintenance of the intrinsic permeability of the producing formation, which is a key factor governing flow to the well bore. It also avoids a reduced permeability interface, a damage zone which is formed when particle-contaminated fluids infiltrate and bridge the formation pore structure, and reduce permeability.

High quality fluids also are essential during acidizing or fracturing in well stimulation or workover operations, for similar reasons. Acid contaminated with particles will invade the pore structure of the pay zone, and result in a reduced permeability interface, and hence reduced flow to the well bore. In fracturing operations, particle invasion of the formation will result in reduced permeability in that zone, and a reduced flow to the well bore.

Secondary water flood operations, both on-shore and off-shore, also utilize filtration to provide a high quality fluid with excellent injectability. With clean fluids there is no need to resort to the practice of "bumping" the pressure, which is of concern since "bumping" can result in fracture, with the result that there can be significant bypass, and lower recovery of oil.

Filtration also can be of assistance in tertiary recovery techniques such as polymer augmented water flood, $CO_2$ flood, Micellar/Polymer floods, and caustic flooding operations. In such cases, filtration leads to clean fluids and stable injection profiles, precluding formation damage, flood front bypassing through fingering, pore injectivity profiles, or the necessity for workover operations.

When the fluid, normally an aqueous brine, contains oil and oil-entrained or oil soluble contaminants naturally present in the oil in the formations, particularly in the form of colloidal particles suspended in the fluid in a rather stable emulsion, rapid contamination and plugging of the filters can result, greatly shortening their life, and requiring replacement of the filters at intervals after rather brief operating intervals, sometimes only minutes after being put onstream, depending upon the amount of oil, and oil-entrained or oil soluble contaminants. This poses a considerable operating difficulty, since the replacement of the filters is not only time-consuming but expensive, and virtually requires doubling of the filtration system to ensure continuous on-stream operation.

In accordance with the present invention, it has been determined that oil-containing aqueous brines that are substantially free from viscosity-increasing agents can have their tendency to contaminate and plug a filter substantially reduced, with a corresponding increase in filter life, by adding to the brine before filtration a sufficient amount of an oxidizing agent capable of reacting with filter plugging contaminants, including oil and/or oil-entrained and/or oil-soluble contaminants such as surface-active compounds present in the brine, and alleviating the plugging tendency, thereby extending filter life. Such contaminants are of a generally oily nature, and may include a major proportion of oil and a minor proportion of other solid or liquid contaminants naturally present with or in the oil as occurring in the formation.

At the time a well casing is perforated in order to provide access to the oil in the formation, oil can enter the brine, and with the oil naturally will also follow any other contaminants present in the formation with the oil. Surprisingly, an oxidizing agent will in some way not presently understood react with the contaminants whatever their nature chemically, having a tendency to plug a filter, in such a manner as to change their physical characteristics and inhibit or substantially delay the contamination that results in rapid plugging of the filter through which the brine is passed. The life of the filter element may be extended by as much as five times or more, by the addition of the oxidizing agent.

The amount of oxidizing agent will depend upon the amount of the contamination, but there is no upper limit except that imposed by economic factors, since of course the addition of the oxidizing agent increases the cost of operation. Generally speaking, the amount of oxidizing agent added can be within the range from about 10 to 200 ppm per 1000 ppm of oil or oily contaminants present preferably from about 10 to 200 ppm per 20,000 ppm of oil or oily contaminants present.

The amount of oily contaminants resulting in rapid plugging of the filter can be so small as to not be detectable by ordinary analytical equipment. The presence of the oily contaminants is nonetheless revealed by the rapid plugging of the filter. Even in such cases, although the amount of oily contaminants has to be estimated, the addition of a sufficient amount of an oxidizing agent that will react with the contaminants will alleviate the plugging tendency, greatly extending the life of the filter.

The process of the invention can utilize any water-soluble oxidizing agent. Sodium hypochlorite is readily available, and inexpensive, and is preferred. Other water-soluble oxidizing agents that can be used include peroxides such as sodium peroxide and barium peroxide; chlorates such as sodium chlorate, and potassium chlorate; permanganates such as potassium permanganate; chromates such as potassium dichromate; and sodium dichromate, chlorine, chlorine dioxide, and hydrogen peroxide.

The process of the invention is applicable to any inorganic briny fluid that is substantially free from viscosity-increasing agents such as sodium carboxymethyl cellulose and water-soluble cellulose ethers such as methyl cellulose and hydroxyethyl cellulose. Aqueous brines prepared from sodium chloride, potassium chloride, calcium chloride, zinc bromide, calcium bromide, sodium bromide and other inorganic halides, usually alkali and alkaline earth metal halides, can be improved by the process of the invention. Any amount of inorganic halide can be present, in accordance with conventional practice, since in the process of the invention the briny salts are in effect inert.

Effective results are obtained by reaction of the oxidizing agent with the oily contaminants at normal atmospheric temperatures. Elevated temperatures need not be used, but of course elevated temperatures arising from the earth temperature in the well are acceptable, and nondeleterious from the standpoint of the oxidizing agent. While some oxidizing agents are unstable at elevated temperatures, or volatile, the reaction(if that is what it is) apparently proceeds quickly enough that addition of the oxidizing agent shortly or even several hours before filtration will suffice to obtain the desired effect on the oily contaminants. The reaction can in fact be complete within a few seconds to several minutes. Time is not critical of course and if the brine has to be stored overnight or for several days before filtration to obtain the effect, this can be done without difficulty.

The following Example illustrates the process of the invention.

EXAMPLE

An aqueous calcium chloride brine containing eleven pounds per gallon calcium chloride and 10,000 ppm of oil and oily contaminants was filtered through a filter disc having a surface area of 0.015 square foot at a flow rate of 6 cc per minute at room temperature. The filter sheet was an epoxy resin impregnated paper having a nominal pore size of 3 $\mu$m and a particle removal rating of 10 $\mu$m absolute.

At the start of the experiment, at a flow rate of 6 cc per minute, the upstream pressure at the filter was 0.3 lb/in$^2$. After one minute, the pressure had increased to 2.4 lb/in$^2$; after one and one-half minutes, to 3.2 lb/in$^2$; after two minutes to 4.5 lb/in$^2$, and after two and one-third minutes to 5 lb/in$^2$.

The flow was then stopped, and the filter surface rinsed with filtered deionized water. Filtration was then resumed. At the start of the second experiment, the upstream pressure at the filter was 0.4 lb/in$^2$. After one minute of flow at 6 cc per minute, the pressure had risen to 4.3 lb/in$^2$; after two minutes to 7.6 lb/in$^2$; after three minutes to 12 lb/in$^2$; after three and one half minutes to 15 lb/in$^2$, and after four and one half minutes to 21 lb/in$^2$, at which time the filter was effectively plugged, and flow was stopped.

To another sample of the same brine was then added 1500 ppm of sodium hypochloride at room temperature. The brine was allowed to stand overnight, and then filtered through another portion of the same filter disc used in the preceding experiment, at the same flow rate of 6 cc per minute, at room temperature.

Initially, the upstream pressure at the filter was 0.9 lb/in$^2$. This pressure held through three minutes of filtration. After four minutes of filtration and through six minutes of filtration, the pressure remained at 1 lb/in$^2$.

Thus, the sodium hypochlorite treatment had considerably extended the filter life. After six minutes of flow, the pressure upstream at the filter was one-fifth that in the first experiment after two and one-third minutes of flow, one-third the time.

The process of the invention is applicable to well completion fluids of all types, as well as to fluids used in gravel pack operations, in secondary water flood operations, both on-and off-shore, and in tertiary recovery techniques. By extending filter life, the process considerably reduces the number of changes of filters required during a given operating period, and assists in maintaining a long on-stream operating time of each filter bank.

Having regard to the foregoing disclosure, the following is claimed as the inventive and patentable embodiments thereof:

1. A process for filtration of aqueous oil-containing brines that are substantially free from viscosity-increasing agents, which comprises adding to an aqueous oil-containing brine having a tendency to contaminate and plug a filter a sufficient amount of an oxidizing agent capable of reacting with plugging contaminants present in the brine to alleviate the plugging tendency, thereby extending filter life.

2. A process according to claim 1 in which the aqueous oil-containing brine is a calcium chloride brine.

3. A process according to claim 1 in which the aqueous oil-containing brine is a sodium chloride brine.

4. A process in accordance with claim 1 in which the oxidizing agent is sodium hypochlorite.

5. A process according to claim 1 in which the amount of oxidizing agent is within the range from 10 to 200 ppm per 1000 to 20,000 ppm of oil-containing contaminants.

* * * * *